(No Model.)
A. FESCA.
METHOD OF AND APPARATUS FOR MASHING SUGAR AND SUGAR MASSES.
No. 297,978. Patented May 6, 1884.
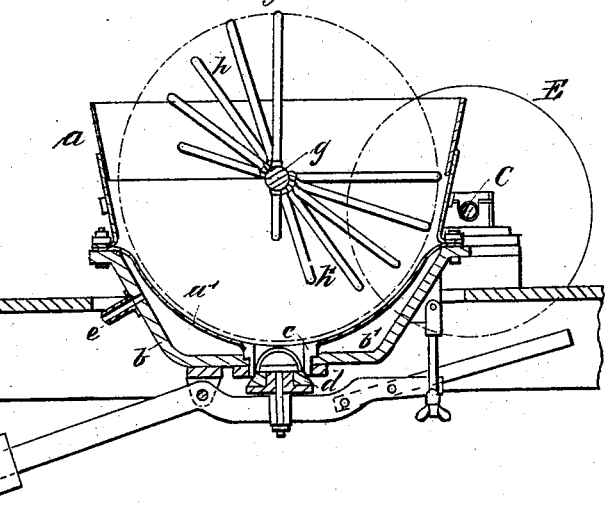
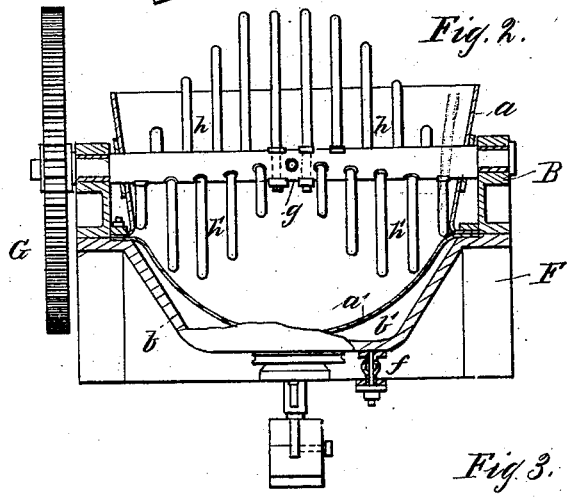
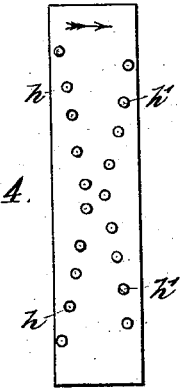
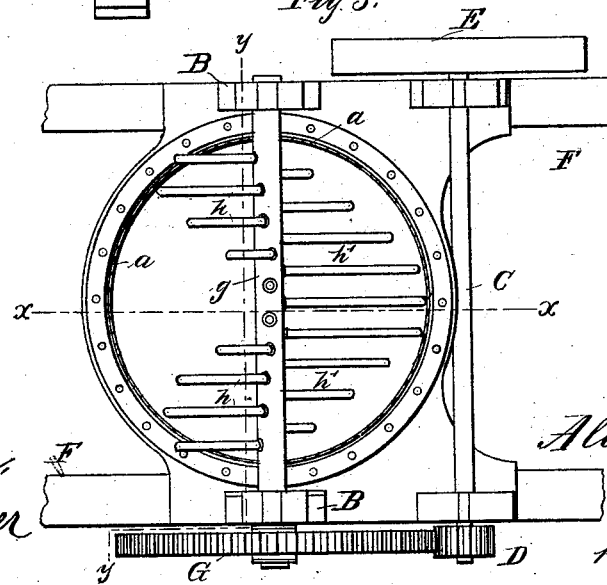
Witnesses
W. E. Boulter
Andrew Palmer
Inventor
Albert Fesca
Fr Henry Ooth
his atty

United States Patent Office.

ALBERT FESCA, OF BERLIN, GERMANY.

METHOD OF AND APPARATUS FOR MASHING SUGAR AND SUGAR MASSES.

SPECIFICATION forming part of Letters Patent No. 297,978, dated May 6, 1884.

Application filed January 8, 1884. (No model.)

*To all whom it may concern:*

Be it known that I, ALBERT FESCA, a subject of the King of Prussia, residing at Berlin, Prussia, German Empire, have invented certain new and useful Improvements in the Method of and Apparatus for Mashing Sugar and Sugar Masses; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

To adapt raw sugar of inferior grade, or comminuted or broken-up masse-cuite, to be more advantageously converted into a high-grade sugar by the centrifugal process, it is necessary to first form a homogeneous mass of the proper fluidity. I have found that the result of this operation of separating the sugar-crystals from impurities by centrifugal action depends both as to time and quality and quantity of the product on preserving the sugar-crystals as much as possible intact, and on the temperature of the material supplied to the centrifugal machine, which should be about 40° or 45° centigrade—a temperature at which the material will be in the state of fluidity, when it will readily separate from the crystals when subjected to centrifugal action. These described results cannot be attained by the process and means heretofore employed for preparing the sugar previous to subjecting the same to centrifugal action. In the treatment, for example, of freshly-boiled sugar masses, they are fed in a heated state directly from the vacuum-pan into the mash-tub or stirring apparatus, with the addition of a broken-up cold masse-cuite and sirup, and stirred continually. By this means it is only with great difficulty that the temperature of the mass under treatment can be reduced to about 60° centigrade, and to reduce the same to 40° or 45° centigrade would require too long a time to make the operation profitable. When the temperature of the mash is 60° centigrade, it yet contains a considerable quantity of sugar in solution, and consequently when heated in the centrifugal machine a large proportion of the sugar in solution cannot be recovered.

In the method of cold-mashing—that is to say, when the material is prepared from cold sugar masses or masse-cuite—the means employed are such as to result in the abrasion or grinding—in fact, pulverizing—a considerable proportion of the sugar-crystals in the mass treated, the stirring or mashing being effected in an apparatus the inner surface of which carries stationary cutting-edges or sharp-edged ribs, with which co-operate like movable edges or stirrers, between which the material is triturated to form a homogeneous mass of the proper fluidity. It has also been proposed to treat raw sugar by washing the same with sirup or sugar-liquor of very poor quality, with the object of obtaining by this process a mixture of sufficient fluidity to adapt it for treatment in the centrifugal machine and cause its uniform distribution over the basket-surfaces thereof. This method has, however, the disadvantage that the sugar-crystals become completely coated with or enveloped in sirup, which coating, owing to its toughness, will adhere with such tenacity to the crystals as to necessitate a repeated washing, while in the centrifugal machine, (as proposed,) by means of jets of water or steam—a process which consumes a great deal of time.

The object of the present invention is to overcome the difficulties referred to above by the following process of and means for preparing (mashing) sugar masses for the centrifugal machines.

In carrying out my invention I employ cold sugar masses, (raw sugar or masse-cuite,) and warm the mass gradually while being stirred in a suitably-constructed apparatus and by means of stirrers devoid of sharp edges operating in a vessel likewise devoid of angular faces or ribs.

In the preparation of masse-cuite I take the thoroughly-cooled and consequently fully-crystallized masse-cuite, break the same up, and place it in a vessel of a curvilinear form, interiorly preferably concave or of semi-cylindrical form, so as to present no sharp edges or angular faces, by which the crystals may be broken or pulverized. To the masse-cuite I add a little sirup of medium quality or grade, or a saccharine solution, and stir the mixture continually, while applying heat to the vessel, until the process is completed and a thoroughly-incorporated mass of a temperature of about 40° or 45° centigrade is obtained, at which temperature the sirup in the mass will be of such fluidity as to readily separate from the crystals when subjected to centrifugal action, as above referred to. When raw sugar is to be prepared for the centrifugal machine, I add a small proportion of water to the sugar, and treat as above described, the process in both cases being identical, except that in treating masse-cuite I employ either a saccharine solution or sirup, and in treating raw sugar I employ water, both being employed to impart to the mass the necessary fluidity.

Any suitably-constructed apparatus may be employed to carry out the above processes. I have, however, invented an apparatus for carrying out the above processes which embodies all the required elements to successfully treat sugar masses.

In the accompanying drawings, Figures 1 and 2 are vertical transverse sections taken on lines $xx$ and $yy$ of Fig. 3, respectively. Fig. 3 is a top plan view of the apparatus, the upper part of the mash tub or vessel being shown in section; and Fig. 4 is a horizontal projection of the periphery of the stirrer-shaft, showing the arrangement of the stirrers.

In the above drawings, $a$ indicates the mash tub or vessel, having smooth interior surfaces, as shown. The part $a'$ of the vessel in which the stirrers operate is concave or semi-spherical, or of curvilinear form. The part $a'$ of the vessel $a$ is fitted in a shell or jacket, $b$, of such dimensions as to form an intervening heating-chamber, $b'$, between said part $a'$ and the jacket or casing $b$, as shown. The part $a'$ is provided with a discharge-pipe, $c$, that passes through the wall of the jacket $b$, and is closed by a valve, $d$. The jacket $b$ has a pipe, $e$, connected with any suitable source of steam-supply, for the introduction of steam into the chamber $b'$, to heat the material contained in vessel $a$, the water resulting from the condensation of the steam being drawn off from time to time at $f$, Fig. 2. The vessel and its jacket are supported from any suitable frame, F, provided with bearings B for a stirrer-shaft, $g$, that passes through the vessel $a$, as shown in Fig. 3.

Upon shaft $g$ are mounted two series of stirrers, $h$ $h'$, of such length as to extend close to the inner face of the part or bottom $a'$ of the vessel $a$ when the shaft is rotated. The shaft $g$ may be rotated in any preferred or desired manner—as, for example, by a pulley mounted upon said shaft and belted directly to a prime motor, or by a gear-wheel, G, mounted upon shaft $g$ and meshing with a pinion, D, upon a counter-shaft, C, that carries the driving-pulley E, which is driven from any suitable prime motor, as shown in Fig. 3, or in any other suitable manner to impart to the shaft the necessary velocity of revolution. As shown, the stirrers $h$ $h'$ are of cylindrical form in cross-sections, and have rounded ends, so as to present no angular faces or sharp edges, by which the sugar-crystals could be injured by abrasion, or grinding, or cutting, as is the case in machines of this class as now constructed. The arrangement of the stirrers $h$ $h'$ on the shaft is such that the space intervening between each two stirrers is at least twice as great as the diameter of one of said stirrers, the stirrers of one series being located in advance of those of the preceding series and on lines intersecting the center of the space intervening between the stirrers of said preceding series, as plainly shown in Fig. 4. By means of this construction and arrangement of stirrers the mass is rendered thoroughly homogeneous without in any way materially injuring the crystals. To facilitate this process, and also to uniformly heat the material, I prefer to arrange the groups or series of stirrers $h$ $h'$ in such manner on their shaft that each series will form two helicoidal threads or paths of a screw-thread, which meet at the longitudinal center of the shaft, the one being a right-hand and the other a left-hand thread, as shown in Fig. 4. It is obvious that when the shaft is rotated in the direction of the arrow, Fig. 4, the action of the series of stirrers $h$ will tend to carry the material from the center in opposite directions toward the walls of the vessel, while that of the second series of stirrers, $h'$, will, on the contrary, tend to carry the material from the opposite sides of the vessel toward its center, or in a reverse direction. It is evident that this successive alternate reciprocating movement of the material, combined with a continuous rotary motion of the particles upon themselves upon the heated surfaces of the concave part $a'$ of the vessel $a$, as well as the spacing of the stirrer-arms, is of such a nature as to protect the sugar-crystals from being crushed or injured, as the movement is essentially a sliding one instead of a frictional movement, between the particles of the mass, as is the case when a series of rotary, angular, or sharp-edged stirrer-arms operating in conjunction with angular or sharp-edged stationary ribs or knives secured to the walls of the vessel are employed.

When the material is subjected to the action of stirrers, as described, although it is a poor conductor of heat, said material will be rapidly heated through by reason of the continuous change in the particles of the mass in contact with the heated surface of the vessel, by which constant change of the particles an overheating of any portion of the material under treatment is also effectually avoided. Nor is it necessary in treating masse-cuite to break up the material so finely as is the case when treated in ordinary machines of this class, for the reason that, being heated, the pieces become soft and separate into crystals without the application of mechanical force. Furthermore, the preparation of the masse-cuite while cold, and consequently perfectly crystallized, has decided and great advantages over the process of treating the same while yet hot, in that a larger proportion of perfect crystals are obtained, for the reason that the process of recrystallization is more perfect when the material is allowed to rest and become cold. Besides this, the sugar-crystals, by my improved method of treatment, are not injured by the mechanical devices, as stated, and "concentrated" saccharine solutions or concentrated sirup can be employed in preparing the mash for the centrifugal machine.

When raw sugar is treated, it is not necessary to grind or break up the hard and tough pieces of sugar previous to preparing the material, because these are sufficiently softened by the application of heat to break up into crystals, while the tough and partially-dried sirup with which the sugar-crystals are coated is also softened by the applied heat to such an extent as to require but little water to free said crystals from their coating. This separation of the coating from the sugar-crystals by my process of treatment is so complete that when subjected to centrifugal action no further washing of the crystals is necessary, so that by the centrifugal action alone a comparatively pure raw sugar is obtained.

Of course it is obvious that the number of stirrer-arms $h\ h'$ may be varied, and that the series or groups of such arms upon the same shaft may be increased, if desired, and each group may be arranged to form more than two screw threads or planes.

Having thus described my invention, what I claim, and desire to secure by Letters Patent of the United States, is—

1. In the manufacture of sugar, the method of preparing raw sugar or masse-cuite for treatment in the centrifugal machine, which consists in mixing the cold raw sugar or cold broken-up masse-cuite with sirup or a saccharine solution or water, to give it the required fluidity, and effecting the mixture under a gradually-increasing temperature while the mass is being agitated in a vessel having smooth interior surfaces, substantially as described, for the purpose specified.

2. In the manufacture of sugar, the method of preparing raw sugar or masse-cuite for treatment in the centrifugal machine, which consists in mixing the cold raw sugar or cold broken-up masse-cuite with sirup or a saccharine solution or water, to give it the required fluidity, and effecting the mixture in a vessel having smooth interior surfaces and under a gradually-increasing temperature until the mass has attained the temperature or about the temperature set forth, as described, for the purpose specified.

3. The herein-described apparatus for preparing raw sugar or masse-cuite for the centrifugal machine, which consists of a receiver or vessel having smooth and preferably curvilinear interior walls, smooth-faced stirrers, or stirrers cylindrical in cross-section, for agitating the material therein, and means, substantially such as described, for applying steam heat to the receiver, as and for the purpose specified.

4. The herein-described apparatus, consisting of a receiver or vessel having smooth and preferably curvilinear interior walls or bottom, and means, substantially such as described, for heating the vessel with steam, in combination with smooth-faced stirrers arranged upon their shaft in groups on helicoidal lines, forming right and left handed screw threads or paths meeting at the longitudinal center of said shaft, substantially as described, for the purpose specified.

5. The herein-described apparatus, consisting of a receiver or vessel having smooth and preferably curvilinear interior walls or bottom, and means, substantially such as described, for heating the vessel with steam, in combination with stirrers arranged upon their shaft in groups on inverse helicoidal lines, forming right and left handed screw-threads, the threads of one group trending from opposite ends toward the center of the shaft, and those of the succeeding group from the center of the shaft toward its extremities, as described.

In testimony whereof I affix my signature in presence of two witnesses.

ALBERT FESCA.

Witnesses:
ADOLF DEMELIUS,
B. ROI.